United States Patent Office 3,564,011
Patented Feb. 16, 1971

3,564,011
METHOD FOR PREPARING 1-ACYL-3-INDOLYL ALIPHATIC ACID DERIVATIVES
Hisao Yamamoto, Nishinomiya-shi, and Masaru Nakao, Osaka, Japan, assignors to Sumitomo Chemical Company, Ltd., Higashi-ku, Osaka, Japan, a corporation of Japan
No Drawing. Filed Dec. 28, 1966, Ser. No. 605,154
Claims priority, application Japan, Jan. 12, 1966, 41/1,999; Apr. 28, 1966, 41/27,300, 41/27,301; May 2, 1966, 41/28,125; May 4, 1966, 41/28,400; June 21, 1966, 41/40,591; July 8, 1966, 41/44,723, 41/44,724; Aug. 19, 1966, 41/54,674, 41/54,675
Int. Cl. C07d 27/56
U.S. Cl. 260—326.13
13 Claims

ABSTRACT OF THE DISCLOSURE

Novel 1-acyl-3-indoyl aliphatic acid derivatives having excellent anti-inflammatory activity with low toxicity and having the formula:

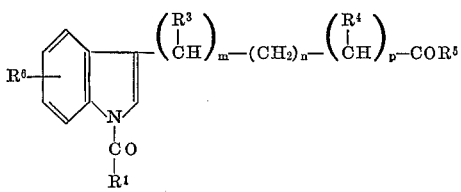

wherein $R^1$ is an alkyl, chlorine substituted alkyl or alkenyl group and has up to 10 carbon atoms, $R^2$ and $R^3$ are, respectively, a hydrogen atom or a lower alkyl group, $R^4$ is a hydrogen atom, a carboxy group or an alkoxylcarbonyl group, $R^5$ is a hydroxy group, $R^6$ is an alkyl ($C_1$–$C_3$) group, an alkoxy ($C_1$–$C_3$) group, an alkyl ($C_1$–$C_3$) thio group, a chlorine atom or a hydrogen atom, $m$ and $p$ are, respectively, 0 or 1, and $n$ is 0 or an integer of from 1 to 3, are produced by reacting an acylated phenylhydrazine compound of the formula:

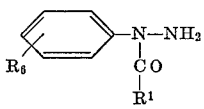

wherein $R^1$ and $R^6$ have the same meanings as defined above, with an aliphatic acid compound of the formula:

wherein $R^2$, $R^3$, $R^4$, $R^5$, $m$, $n$ and $p$ have the same meanings as defined above.

This invention relates to a method for preparing 1-acyl-3-indoyl aliphatic acid derivatives represented by the general formula:

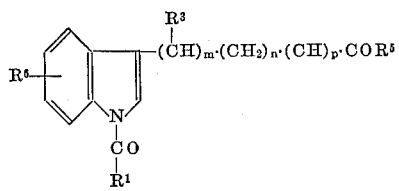

wherein $R^1$ is an unsubstituted or halogen-substituted alkyl group or alkenyl group having up to 10 carbon atoms; $R^2$ and $R^3$ are, respectively, a hydrogen atom or lower alkyl group having up to 3 carbon atoms; $R^4$ is a hydrogen atom, carboxy group or alkoxycarbonyl group having up to 4 carbon atoms; $R^5$ is an alkoxy group having up to 4 carbon atoms, benzyloxy group, tetrahydropyranyloxy group, hydroxy group or amino group; $R^6$ is a lower alkyl group having up to 4 carbon atoms, alkoxy group having up to 3 carbon atoms, alkylthio group having up to 3 carbon atoms, halogen atom or hydrogen atom; $m$ and $p$ are, respectively, 0 or 1; and $n$ is 0 or an integer of 1 to 3.

The 3-indoyl aliphatic acid derivatives represented by the general Formula I are obtained in high yields by reacting at an elevated temperature a hydrazine derivative, or a salt thereof, represented by the general formula:

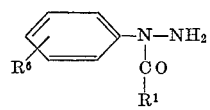

wherein $R^1$ and $R^6$ have the same significance as defined before, with an aliphatic acid derivative represented by the general formula:

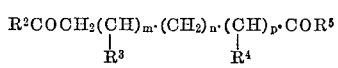

wherein $R^2$, $R^3$, $R^4$, $R^5$, $m$, $n$ and $p$ have the same significances as defined before, either as such or in an organic solvent in the presence or absence of a suitable condensing agent.

The reaction of the present invention proceeds smoothly even when no solvent is used but, in some cases, the use of suitable solvents is preferable. For example, in the condensation of free aliphatic acids, it is preferable to use organic acids such as acetic, formic, propionic, lactic and butyric acids; non-polar organic solvents such as cyclohexane, n-hexane, benzene and toluene; or organic solvents such as dioxane and dimethylformamide, while in the condensation of aliphatic acid alkyl esters, it is desirable to use suitable alcohols, in addition to said solvents. The reaction progresses at any temperature within the range of from 50° to about 200° C., but the adoption of a temperature range of from 65° to 90° C. is the most preferable. The condensing agent is not always required, but the use of inorganic acids such as hydrochloric, sulfuric and phosphoric acids gives favorable results, in general. The above-mentioned reaction solvents, reaction temperatures and condensing agents are raised as examples, and the invention is not limited thereto.

The method of the present invention is extremely novel; not only the synthesis method itself is entirely unknown but most of the starting materials, i.e. asymmetric hydrazine derivatives and salts thereof, are novel compounds. That is, the synthesis of indole compounds having N-positions substituted by acyl groups is described in, for example, Elderfield: "Heterocyclic Compounds," vol. 3 (1952), Chapter 1, pages 1–247, and W. C. Sumpter and F. M. Miller: "Heterocyclic Compounds with Indole and Carbazole Systems" (1954), pages 1–69. However, the synthesis of N-acyl-indole compounds in accordance with the method of the present invention has never been reported nor described in any Japanese or foreign literature of new publication. Thus, the method of the present invention is entirely novel. 1-substituted acyl groups of 1-acyl-indole compounds are so easily hydrolyzed by acid or alkali that it has been considered impossible to obtain 1-acyl-indole derivatives directly from corresponding $N^1$-acylated phenylhydrazine derivatives by Fischer's indolization. Suvorov et al. [Suvorov et al.: Doklady Acad. Nauk U.S.S.R. 136,840 (1961), Chem. Abstr. 55, 17621 (1961), J. Gen. Chem., U.S.S.R., 28, 1058 (1958)] have recently reported about this problem as follows:

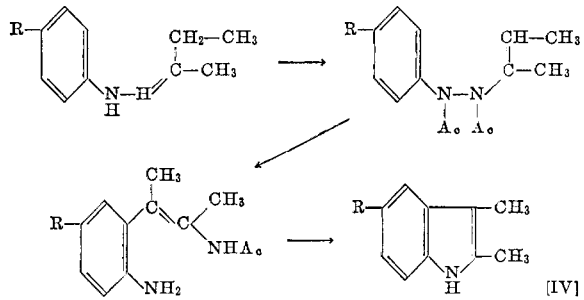

They have explained that Fischer's indolization does not proceed without deacylation of a hydrazine compound [IV], because freedom of p-electron pair is necessary for formation of a new C—C bond.

The present inventors, however, were able to find that 1-acyl-indole compounds can be directly synthesized from $N^1$-acylated phenylhydrazines according to the present novel method. The process of the present invention may be explained by the following reaction process:

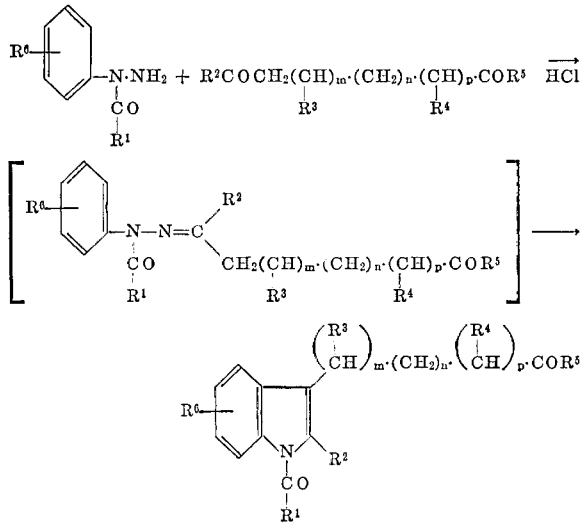

wherein $R^1$ to $R^6$ and $m$, $n$ and $p$ have the same meanings as identified above.

1-acyl-indolyl aliphatic acids have conventionally been synthesized according to a process carried out by first preparing an indolyl aliphatic acid ester and then acylating said ester, and, if necessary, hydrolyzing the ester to free acid. Thus, the conventional process has been markedly complicate and low in yield.

In accordance with the method of the present invention, 1-acyl-indolyl aliphatic acids can be synthesized in extremely high yields and no such complicate operations as in the conventional process are required. The present method is greatly advantageous not only for laboratory scale production but also for commercial scale production.

The indolyl aliphatic acid derivatives obtained according to the method of the present invention have prominent actions as anti-inflammatory, analgesic and anti-pyretic, and are markedly useful compounds.

3-indolyl aliphatic acid derivatives easily obtainable in accordance with the method of the present invention are, for example, N-heptanoyl-2-methyl-5-methyl-3-indolyl-butyric acid, N-(4-chlorohexanoyl)-5-chloro-3-indolylpropionic acid, and ethyl 2-(N-chloroacetyl-5-methoxy-3-indolyl)-propionate.

In case the substituent in the phenylhydrazine derivative represented by the Formula II is in the p-position, the resulting indole derivative represented by the Formula I is a single substance, whereas in case the substituent is in the m-position, two isomers are simultaneously produced according to the present reaction, in general. For example, it is considerably difficult, in general, to separate the following two isomers:

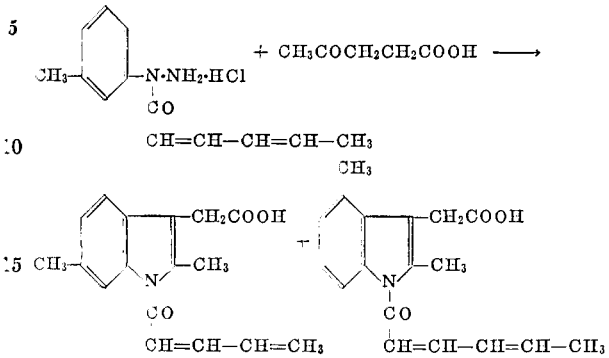

However, the two isomers can be separated when careful operations are effected according to column chromatography using suitable column filler and developer.

In accordance with the present invention, such compounds as enumerated below can be obtained easily and in high yields.

1-acetyl-2-methyl-6-methoxy-3-indolylacetic acid and 1-acetyl-2-methyl-4-methoxy-3-indolylacetic acid.

1-chloroacetyl-2-methyl-6-methoxy-3-indolylacetic acid and 1-chloroacetyl - 2 - methyl-4-methoxy-3-indolylacetic acid.

1-propionyl-2-methyl-6-methoxy - 3 - indolylacetic acid and 1-propionyl-2-methyl-4-methoxy-3-indolylacetic acid.

1-n-butyroyl-2-methyl-6-methoxy - 3 - indolylacetic acid and 1-n-butyroyl - 2 - methyl - 4 - methoxy-3-indolylacetic acid.

1-n-pentanoyl-2-methyl-6-methoxy-3-indolylacetic acid and 1-n-pentanoyl-2-methyl - 4 - methoxy-3-indolylacetic acid.

1 - n - hexanoyl - 2 - methyl - 6 - methoxy - 3 - indolylacetic acid and 1-n-hexanoyl-2-methyl-4-methoxy-3-indolylacetic acid.

β - [1 - chloroacetyl - 2 - methyl - 6 - methoxy - 3 - indolyl]propionic acid and β-[1-chloroacetyl-2-methyl-4-methoxy-3-indolyl]-propionic acid.

γ - [1 - chloroacetyl - 2 - methyl - 6 - methoxy - 3 - indolyl]-butyric acid and γ-[1-chloroacetyl-2-methyl-4-methoxy-3-indolyl]-butyric acid.

α - [1 - n - hexanoyl - 2 - methyl - 6 - methoxy - 3 - indolyl]propionic acid and α-[1-n-hexanoyl-2-methyl-4-methoxy-3-indolyl]-propionic acid.

1 - n - hexanoyl - 2 - methyl - 6 - chloro - 3 - indolylacetic acid and 1-n-hexanoyl-2-methyl-4-chloro-3-indolylacetic acid.

Methyl 1-hexanoyl-2-methyl-6-methoxy-3-indolylacetate and methyl 1-n-hexanoyl-2-methyl-4-methoxy-3-indolylacetate.

t-Butyl 1-n-hexanoyl-2-methyl-6-methoxy-3-indolylacetate and t-butyl 1-n-hexanoyl-2-methyl-4-methoxy-3-indolylacetate.

Benzyl 1 - n - hexanoyl - 2 - methyl - 6 - methoxy - 3 - indolylacetate and benzyl 1-n-hexanoyl-2-methyl-4-methoxy-3-indolylacetate.

1 - n - hexanoyl - 2 - methyl - 5,6 - dimethoxy - 3 - indolylacetic acid and 1-n-hexanoyl-2-methyl-4,5-dimethoxy-3-indolylacetic acid.

1 - (2',4' - hexadienoyl) - 2 - methyl - 6 - methoxy - 3 - indolylacetic acid and 1-(2',4'-hexadienoyl)-2-methyl-4-methoxy-3-indolylacetic acid.

Methyl 1-chloroacetyl-6-methoxy-3-indolylacetate and methyl 1-chloroacetyl-4-methoxy-3-indolylacetate.

1 - acetyl - 2 - methyl - 6 - methoxy - 3 - indolylacetic acid and 1-acetyl-2-methyl-4-methoxy-3-indolylacetic acid.

1 - n - heptanoyl - 2 - methyl - 6 - methoxy - 3 - indolylacetic acid and 1-n-heptanoyl-2-methyl-4-methoxy-3-indolylacetic acid.

1-iso-butanoyl-2,6-dimethyl-3-indolylacetic acid and 1-isobutanoyl-2,4-dimethyl-3-indolylacetic acid.

1 - n - octanoyl - 2 - methyl - 6 - methoxy - 3 - indolylacetic acid and 1-n-octanoyl-2-methyl-4-methoxy-3-indolylacetic acid.

1 - n - decanoyl - 2 - methyl - 6 - methoxy - 3 - indolylacetic acid and 1-n-decanoyl-2-methyl-4-methoxy-3-indolylacetic acid.

In the method of the present invention, when the aliphatic acid compound [III] of which $R^4$ in the formula is carboxy group reacts with a hydrazine derivative, or a salt thereof of the Formula II, the resulting 3-indolyl-aliphatic acid compound [I] is decarbonated in some cases so that $R^4$ becomes H in its formula as shown below.

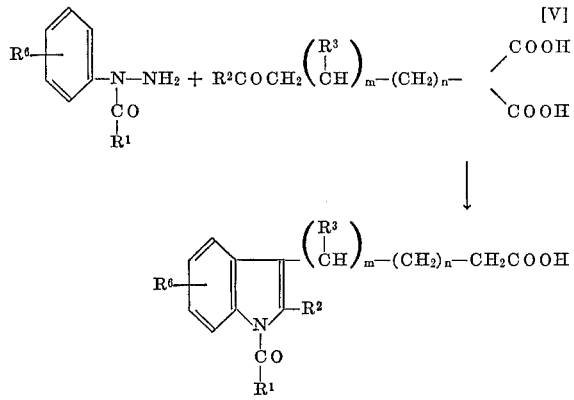

The reaction temperature adopted in this case is from 60° to 200° C., preferably from 80° to 140° C. As the solvents, there are used organic acids such as acetic, propionic and lactic acids; inert organic solvents such as benzene and toluene; or other various organic solvents such as acetonitrile and butanol. As the condensing agents, there are employed inorganic acids such as hydrochloric and sulfuric acids; metal halides such as zinc chlorides or boron fluorides.

The above method of the present invention requires no complex means or procedures and is extremely high in yield as compared with the conventional process. The above method therefore is markedly advantageous not only for laboratory scale production but also for commercial scale production. One example of this method is as follows:

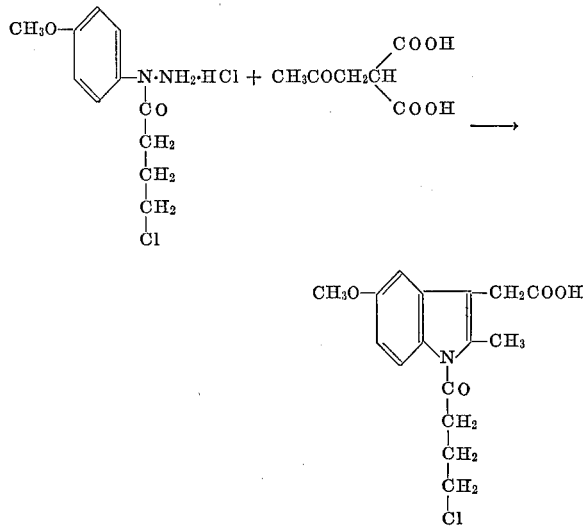

In accordance with this method the following compounds are obtained:

1 - (4' - chlorobutyroyl) - 2 - methyl - 5 - methoxy - 3-indolylacetic acid.

α - [1 - (4' - chlorobutyroyl) - 2 - methyl - 5 - methoxy-3-indolyl]-propionic acid.

1 - (2',4' - hexadienoyl) - 2 - methyl - 5 - methoxy - 3-indolylacetic acid.

1 - (4' - chlorobutyroyl) - 2,4 - dimethyl - 3 - indolylacetic acid and 1-(4'-chlorobutyroyl)-2,6-dimethyl-3-indolylacetic acid.

1-acetyl-2-methyl-5-methoxy-3-indolylacetic acid.

1-acetyl-2,5-dimethyl-3-indolylacetic acid.

α-[1-(4'-chlorobutyroyl) - 2 - methyl - 5 - methoxy-3-indolyl] propionic acid.

1-(4'-chlorobutyroyl)-2-methyl-5-chloro - 3 - indolylacetic acid.

1-(4'-chlorobutyroyl)-5-methoxy-3-indolylacetic acid.

1-(4'-clorobutyroyl)-2-methyl-4-methoxy - 3 - indolylacetic acid and 1-(4'-chlorobutyroyl)-2-methyl-6-methoxy-3-indolylacetic acid.

1-(4'-chlorobuoyroyl)-2,4-dimethyl - 3 - indolylacetic acid and 1 - (4'-chlorobutyroyl)-2,6-dimethyl-3-indolylacetic acid.

1-heptanoyl-2-methyl-5-methoxy-3-indolylacetic acid.

1-hexanoyl-2-methyl-5-methoxy-3-indolylacetic acid.

1-octanoyl-2-methyl-5-methoxy-3-indolylacetic acid.

Furthermore, the 1-acyl-3-indolyl aliphatic acid derivatives represented by the Formula I can be obtained by reacting an $N^1$-acyl-phenylhydrazone derivatives represented by the general formula:

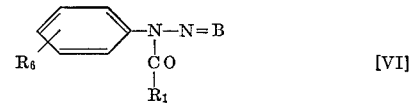

wherein $R^1$ and $R^6$ are as defined before, and B is a ketone or an aldehyde residue, with a ketone compound represented by the Formula III.

As solvents there are used organic acids such as formic, propionic, lactic and butyric acids; non-polar organic solvents such as cyclohexane, n-hexane, benzene and toluene; or alcohols. The reaction proceeds at a temperature within the range of from 50° to 200° C., but a temperature of from 65° to 95° C. is preferable. Condensing agents employed are inorganic acids such as hydrochloric and sulfuric acids, metal halides such as zinc chloride and copper chloride, heavy metal powders, boron fluorides or polyphosphoric acids.

The $N^1$-acyl-phenylhydrazone derivative, which is a starting material employed in the above reaction, is synthesized in the following manner:

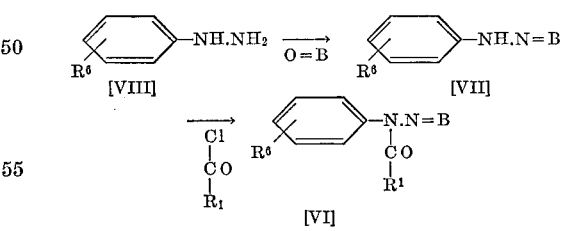

That is, a phenylhydrazine derivative [VIII] is reacted in a suitable solvent, e.g. alcohol, with a ketone or aldehyde compound to yield a corresponding phenylhydrazone compound [VII], which is then acylated with R'COCl in a pyridine solvent, whereby the $N^1$-acyl-phenylhydrazone derivative represented by the Formula VI can be obtained.

As B, a group which itself takes no or little part in the ring-closing reaction is preferable. Suitable as such group is, for example,

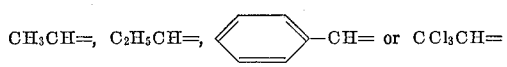

The N=C bond in the hydrazone [VII] is considerably unstable in acid, and it is considered that in a solvent in the presence of acid, there has been established the following equation:

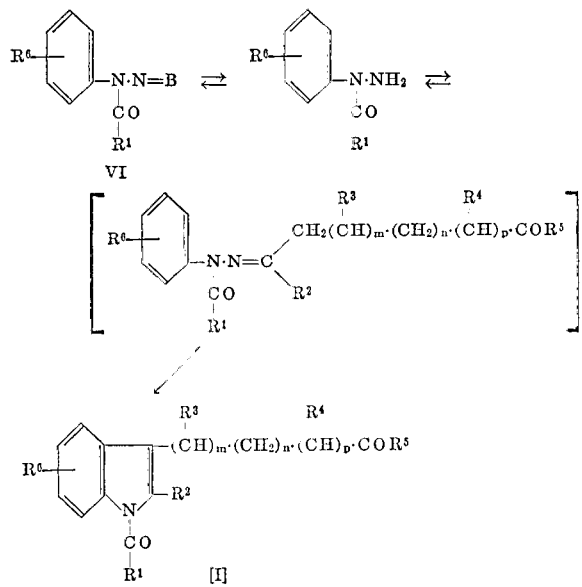

According to this method, the following compounds are synthesized:

1-acetyl-2-methyl-5-methoxy-3-indolylacetic acid.
1-chloroacetyl-2-methyl-5-methoxy-3-indolylacetic acid.
1(2'4'-hexadienoyl)-2-methyl-5-methoxy - 3 - indolylacetic acid.
1-acetyl-2,5-dimethyl-3-indolylacetic acid.
1-propionyl-2-methyl-5-methoxy-3-indolylacetic acid.
Methyl 1 - i - butyroyl-2-methyl-5-methoxy-3-indolylacetate.
Ethyl 1 - n-pentanoyl-2-methyl-5-methoxy-3-indolylacetate.
t-Butyl 1-n-hexanoyl-2-methyl-5-methoxy-3-indolylacetate.
1-(4'-chlorobutyroyl)-2-methyl - 5 - methoxy-3-indolylacetic acid.
γ-[1-(4'-chlorobutyroyl)-2-methyl - 5 - methoxy-3-indolyl]-butyric acid.
β-[1-(4'-chlorobutyroyl) - 2 - methyl - 5 - methoxy-3-indolyl]-propionic acid.
α-[1-(4'-chlorobutyroyl)-2-methyl - 5 - methoxy - 3 - indolyl]-propionic acid.
1-(4'-chlorobutyroyl) - 2 - methyl - 5 - chloro-indolylacetic acid.
1-(4'-chlorobutyroyl)-5-methoxy-3-indolylacetic acid.
1-(4'-chlorobutyroyl)-2-methyl - 4 - methoxy-3-indolylacetic acid and 1-(4'-chlorobutyroyl)-2-methyl-6-methoxy-3-indolylacetic acid.
1-(4'-chlorobutyroyl)-2,4-dimethyl-3-indolylacetic acid and 1 - (4'-chlorobutyroyl)-2,6-dimethyl-3-indolylacetic acid.
1-n-hexanoyl-2-methyl-5-methoxy-3-indolylacetic acid.
1-n-heptanoyl-2-methyl-5-methoxy-3-indolylacetic acid.
1-octanoyl-2-methyl-5-methoxy-3-indolylacetic acid.
1-decanoyl-2-methyl-3-indolylacetic acid.

The N¹-acyl-phenylhydrazone derivatives [VI] and N¹-acyl-phenylhydrazine derivatives [II] and salts thereof shown below, which are starting materials employed in the present reaction, are also novel compounds.

Hydrazone derivatives represented by the general formula:

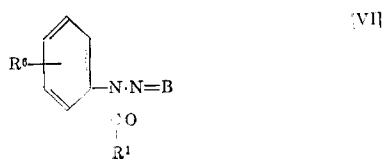

wherein R¹, R⁶ and B are as defined before, and hydrazine derivatives, and salts thereof, represented by the general formula:

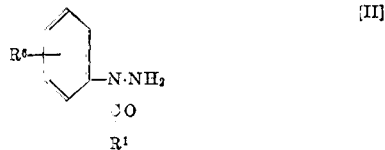

wherein R¹ and R⁶ are as defined before.

These compounds are prepared in the following manner:
Hydrazone derivatives represented by the general formula

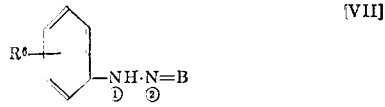

wherein R⁶ and B are as defined before, are reacted under suitable conditions with compounds represented by the general formula:

wherein R¹ is as defined before; and Y is a halogen atom or ester residue, to obtain the novel phenylhydrazone derivatives represented by the Formula VI or the novel phenylhydrazine derivatives represented by the Formula II.

The above reaction proceeds through the course of [VII]+[IX]→[VI]→[II], and in order to obtain the compounds of the Formula VI or II, the hydrazone derivatives represented by the Formula VII should be used as starting materials. In case N² has been acylated without having been covered with suitable ketones or aldehydes, undesired symmetrical hydrazine compounds also are obtained. That is, in the above case, the reaction progresses according to the equation:

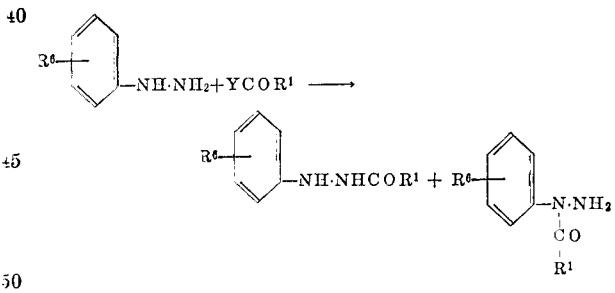

wherein R¹, R⁶ and Y are as defined before.

Ketones or aldehydes to be used to cover N² are not particularly limited and any of these may be used. In practice, however, it is desirable to use those which bring about no side reactions and which are inexpensive and are practical for commercial use. Suitable of these are, for example, acetaldehyde, chloral and benzaldehyde.

According to the above method, the following hydrazone derivatives can be obtained:

Acetaldehyde-N¹-(3-chloropropionyl)-N¹-(p-methoxyphenyl)-hydrazone
Acetaldehyde-N¹-(4-chlorobutyloyl)-N¹-(p-methoxyphenyl)-hydrazone
Acetaldehyde-N¹-(2-methyl-3-chloropropionyl)-N¹-(p-methoxyphenyl)-hydrazone
Acetaldehyde-N¹-(3-chloropropionyl)-N¹-(p-tolyl)-hydrazone
Acetaldehyde-N¹-(3-pentenoyl)-N¹-(p-methoxyphenyl)-hydrazone
Acetaldehyde-N¹-(chloroacetyl)-N¹-(m-methoxyphenyl)-hydrazone
Acetaldehyde-N¹-(chloroacetyl)-N¹-(m-tolyl)-hydrazone
Acetaldehyde-N¹-(chloroacetyl)-N¹-(p-methoxyphenyl)-hydrazone Benzaldehyde-N¹-(chloroacetyl)-N¹-phenylhydrazone
Acetaldehyde-N¹-(2,4-hexadienoyl)-N¹-(p-methoxyphenyl)-hydrazone
Benzaldehyde-N¹-acetyl-N¹-phenylhydrazone
Acetaldehyde-N¹-acetyl-N¹-phenylhydrazone In reacting the hydrazone derivatives represented by the Formula VII with the compounds represented by the Formula IX, in some case the —N=C— bonds have been weakened by means of B, there are obtained, in general the hydrazone derivatives represented by Formula VI, for example in the case of such hydrazone compounds of acetaldehyde, methyl levulinate, etc., or the reaction has been effected under relatively severe conditions, the hydrazone bonds are easily broken after acylation to directly give the hydrazine derivatives of the Formula II in place of hydrazone derivatives of the Formula VI. For example, N¹-(2,4-hexadienoyl) - N¹ - (p - methoxyphenyl) - hydrazine, and N¹-(chloroacetyl)-phenylhydrazine are directly obtained from hydrazines corresponding thereto.

As the acylating agents, acyl halides are most suitable. However, the reaction proceeds as well by use of, for example, acid anhydrides to sometimes give the desired products.

Generally, the novel hydrazine derivatives represented by the Formula II and salts thereof are obtained in high yields by the acid decomposition of the hydrazone derivatives represented by the Formula VI.

As the phenylhydrazone derivatives represented by the Formula VI, there are used various ketone compounds or aldehyde compounds such as, for example, diethylketone, phenylethylketone, ethylbutylketone, methoxyacetone, benzaldehyde, acetaldehyde, chloral, methyl levulinate and γ-methoxybutylaldehyde. In the above case, it is desirable to use a compound which can be readily decomposed after completion of reaction and causes no side reaction that lowers the yield and which is easily obtainable. In view of these points, it may be said that acetaldehyde is best suitable.

As the solvents to be used in the decomposition of said hydrazones, alcohols are preferred. However, in case more than an equivalent of alcohol is used in combination, it is also possible to use an ordinary inert solvent such as, for example, ether, benzene or toluene.

For the decomposition, an inorganic acid is used in general, but an organic acid may also be used in some case. However, the use of an organic acid is not preferable in most cases, because not only the reaction yield is low but side reactions are liable to be brought about. Preferable inorganic acids are hydrochloric, sulfuric and phosphoric acids. In this case, more favorable yields can be attained in a dry state than in wet state.

The reaction terminates in a short period even at a low temperature and is markedly high in yield. Further, the desired hydrazine derivatives are obtained in the form of salts, and therefore crystals thereof can be easily obtained either by concentrating the solvents or by cooling the reaction liquids. Moreover, when these salts are added to an alkali solution, even free hydrazine derivatives can quantitatively be obtained.

According to the above process, there are produced, for example,

N¹-(3-chloropropionyl)-N¹-(p-methoxydiphenyl)-hydrazine,
N¹-(4-chlorobutyloyl)-N¹-(p-methoxyphenyl)hydrazine,
N¹-(2-methyl-3-chloropropionyl)-N¹-(p-methoxyphenyl)-hydrazine,
N¹-(3-chloropropionyl)-N¹-(p-tolyl)-hydrazine,
N¹-(3-pentenoyl)-N¹-(p-methoxyphenyl)-hydrazine,
N¹-(chloroacetyl)-N¹-(m-methoxyphenyl)-hydrazine,
N¹-(chloroacetyl)-N¹-(m-tolyl)-hydrazine,
N¹-(chloroacetyl)-N¹-(p-methoxyphenyl)-hydrazine,
N¹-(chloroacetyl)-N¹-phenylhydrazine,
N¹-(chloroacetyl)-N¹-(p-chlorophenyl)-hydrazine,
N¹-(2,4-hexadienoyl)-N¹-(p-methoxyphenyl)-hydrazine,
N¹-(2,4-hexadienoyl)-N¹-(p-methylthiophenyl)-hydrazine,
N¹-acetyl-N¹-phenylhydrazine and
N¹-acetyl-N¹-(m-chlorophenyl)-hydrazine, and hydrochlorides, sulfates and phosphates of said hydrazines.

These compounds have stimulating, tranquilizing, bacteriocidal and tumor-static actions, and are markedly useful. In addition thereto, they are also important as intermediates for various medicines such as, for example, anti-inflammatory drugs, analgesics, anti-pyretics, tranquilizers, and anti-atherosclerosis drugs.

Further, the 1-acyl-indolyl aliphatic acid derivatives represented by the Formula I can also be obtained according to the following method:

That is, phenylhydrazone derivatives represented by the general formula

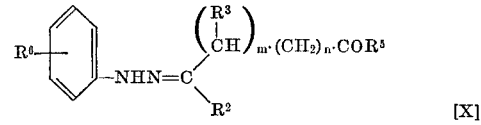

wherein R², R³, R⁵, R⁶, m and n are the same as in the case of Formula I, are reacted in a suitable solvent with the acyl compounds represented by the Formula IX to prepare the 1-acyl-3-indolyl aliphatic acid esters represented by the Formula I.

Suitable solvents employed in the above method are inert solvents, organic acids and organic acid esters. As the inert solvents, there are used, for example, benzene, toluene, xylene, cyclohexane, tetrahydrofuran and hexane; as the organic acids, acetic, chloracetic, propionic, butyric, caproic and heptanoic acids; and as the organic acid esters, ethyl chloroacetate, methyl butyrate, methyl acrylate, methyl valeriate and methyl sorbate.

As the acyl compound represented by the Formula IX acyl chloride is most frequently employed. In addition thereto, acyl bromide or acid anhydride may also be used.

The reaction temperature is from 30° to 150° C., preferably from 80° to 120° C. Generally, the reaction is complete in about several hours.

When, after completion of the reaction, the solvent is concentrated or acetic acid, water or petroleum ether is added, a desired product is deposited, and when the product is concentrated after extraction with ether, benzene or chloroform, a purified product can be obtained.

According to the above method, the following compounds are obtained:

Methyl 1-acetyl-2-methyl-5-methoxy-3-indolylacetate
Ethyl 1-acetyl-2-methyl-5-methoxy-3-indolylacetate
Methyl 1-chloroacetyl-2-methyl-5-methoxy-3-indolylacetate
t-Butyl 1-chloroacetyl-2-methyl-5-methoxy-3-indolylacetate

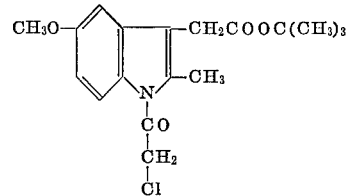

Benzyl 1-chloroacetyl-2-methyl-5-methoxy-3-indolylacetate
Tetrahydropyranyl 1-chloroacetyl-2-methyl-5-methoxy-3-indolylacetate

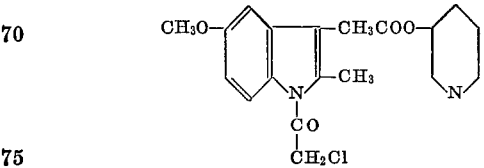

Methyl 1-chloroacetyl-2-methyl-5-methylthio-3-indolylacetate
Methyl 1-chloroacetyl-2-methyl-5-chloro-3-indolylacetate
Methyl 1-chloroacetyl-2,5-dimethyl-3-indolylacetate
Methyl α-[1-chloroacetyl-2-ethyl-5-methoxy-3-indolyl]-propionate
Methyl γ-[1-chloroacetyl-2-methyl-5-methoxy-3-indolyl]-butyrate
Methyl 1-chloroacetyl-5-methoxy-3-indolylacetate
Methyl 1-acroyl-2-methyl-5-methoxy-3-indolylacetate
Methyl 1-butyloyl-2-methyl-5-methoxy-3-indolylacetate
Methyl 1-heptanoyl-2-methyl-5-methoxy-3-indolylacetate
Methyl 1(2',4'-hexadienoyl)-2-methyl-5-methoxy-3-indolylacetate.

All these 1-acyl-3-indolyl alphatic acid esters are novel compounds and have antiphlogistic, analgesic and antipyretic actions. Further, some of these esters, such as for example, t-butyl ester, benzyl ester and tetrahydropyranyl ester, are hydrolyzed by suitable treatment to become 1-acyl-3-indolyl aliphatic acids. The free type acids are higher in pharmacological activity than the ester type acids.

The 1-acyl-3-indolyl aliphatic acid compounds can also be prepared according to the following process:

That is, compounds represented by the general formula

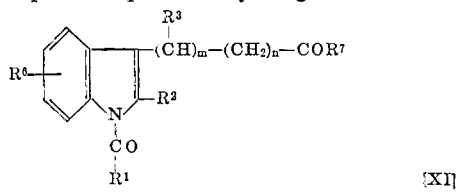

wherein $R^1$, $R^2$, $R^3$, $R^6$, $m$ and $n$ are as defined before; and $R^7$ is an alkoxy, amino or benzyl group, are decomposed to obtain on commercial scale novel 1-acyl-3-indolyl aliphatic acid derivatives represented by the general formula

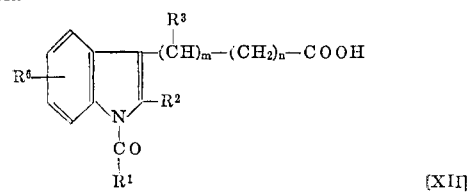

wherein $R^1$, $R^2$, $R^3$, $R^6$, $m$ and $n$ are as defined above.

For example, a benzyl ester of a 3-indolyl aliphatic acid derivative is hydrogenated in the presence of a suitable metal catalyst, e.g. palladium, whereby the ester is decomposed to give a free 3-indolyl aliphatic acid derivative. The reaction is, for example, as follows:

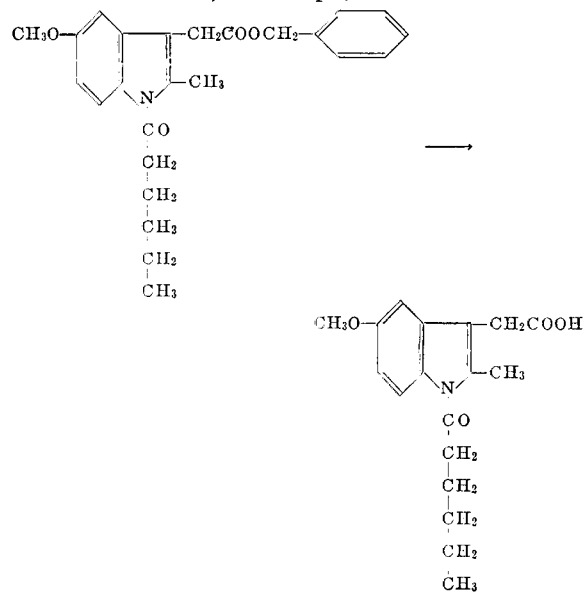

Further, when a tertiary butyl ester of said acid is treated in the presence of an aryl-sulfonic acid, e.g. p-toluene sulfonic acid, it is hydrolyzed to give the desired product. There are some cases where the desired product sometimes is obtained by mere heating and melting the tertiary butyl ester. The reaction is, for example, as follows:

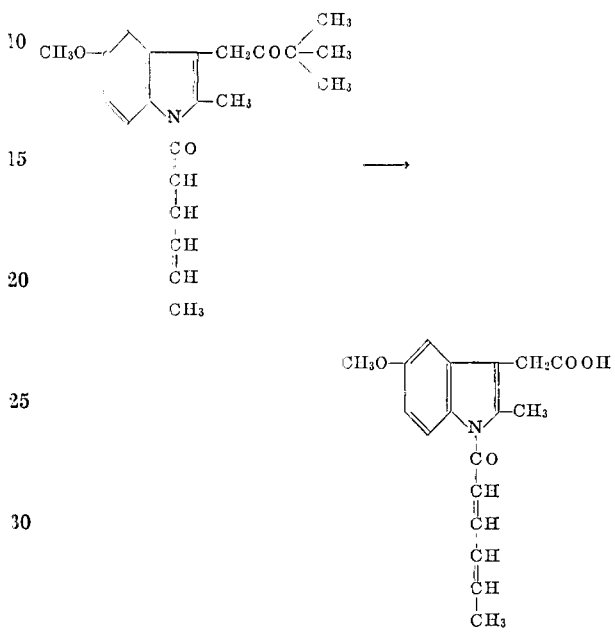

Furthermore, when a 3-indolyl aliphatic acid amide is treated in an inert solvent in the presence of a suitable amount of nitrous acid, a desired free 3-indolyl aliphatic acid is sometimes obtained.

According to the above process, the following compounds can be obtained:

1-(2',4'-hexadienoyl)-2-methyl-5-methoxy-3-indolylacetic acid
1-(2',4'-hexadienoyl)-2-methyl-4-methoxy-3-indolylacetic acid
1-(2',4'-hexadienoyl)-2-ethyl-6-methoxy-3-indolylacetic acid
γ-[1-(2',4'-hexadienoyl)-2-methyl-5-methoxy-3-indolyl]-butyric acid
1-(2',4'-hexadienoyl)-2-ethyl-5-methylthio-3-indolylacetic acid
α-[1-(2',4'-hexadienoyl)-2-ethyl-5-methoxy-3-indolyl]-propionic acid
1-(n-butyroyl)-2-methyl-5-methoxy-3-indolylacetic acid
1-isobutyroyl-2-methyl-5-methoxy-3-indolylacetic acid
1-(2',4'-hexadienoyl)-5-methoxy-3-indolylacetic acid
1-(3',3'-diethylacryloyl)-2-methyl-5-methoxy-3-indolylacetic acid
1-(5'-chloro-3'-pentenoyl)-2-methyl-5-methoxy-3-indolylacetic acid
1-(5'-chloro-3'-pentenoyl)-2,5-dimethyl-3-indoylacetic acid
1-chloroacetyl-2-methyl-5-methoxy-3-indolylacetic acid
1-acetyl-2-methyl-5-methoxy-3-indolylacetic acid
1-(5'-chloro-3'-pentenoyl)-2-methyl-5-methylthio-3-indolylacetic acid
α-[1-(5'-chloro-3'-pentenoyl)-2-methyl-5-methoxy-3-indolyl]-propionic acid
1-(5'-chloro-3'-pentenoyl)-2-methyl-4-methoxy-3-indolylacetic acid
1-(5'-chloro-3'-pentenoyl)-2-methyl-6-methoxy-3-indolylacetic acid
1-(5'-chloro-3'pentenoyl)-2,4-dimethyl-3-indolylacetic acid 1-(5'-chloro-3'-pentenoyl)-2,6-dimethyl-3-indolylacetic acid
1-(n-heptanoyl)-2-methyl-5-methoxy-3-indolylacetic acid
1-(2'-ethylhexanoyl)-2-methyl-5-methoxy-3-indolylacetic acid
1-chloroacetyl-2-methyl-4-methoxy-3-indolyacetic acid
1-chloroacetyl-2-methyl-6-methoxy-3-indolylacetic acid
1-(n-caproyl)-2-methyl-5-methoxy-3-indolylacetic acid
1-(3'-chloropropionoyl)-2-methyl-5-methoxy-3-indolyl-acetic acid
1-(2'-chloropropionoyl)-2-methyl-5-methoxy-3-indolyl-acetic acid
1-crotonoyl-2-methyl-5-methoxy-3-indolylacetic acid
1-(n-hexanoyl)-2-methyl-5-methoxy-3-indolylacetic acid
1-(methacryloyl)-2-methyl-5-methoxy-3-indolylacetic acid As another method for preparing the 1-acyl-indolyl aliphatic acid compounds represented by the general Formula I, there is the following process:

That is, the 1-acyl-3-indolylacetic acid derivatives represented by the Formula I can be obtained by dehydrating or simultaneously hydrolyzing 1-acyl-3-hydroxy-2,3-dihydro-3-indolylacetic acid derivatives represented by the general formula:

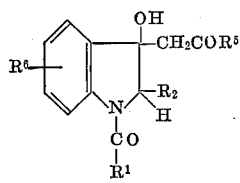

[XIII]

wherein $R^1$, $R^2$, $R^5$ and $R^6$ are as defined before. This reaction proceeds, in general, by heating the compounds in an inert solvent with stirring. The reaction progresses so far as the heating temperature is in the range of from 70° to 200° C. However, in case the reaction does not proceed smoothly, the compound is either azeotropically refluxed using, as solvent, benzene, toluene or xylene which boils together with water, or is heated in the presence of a suitable dehydrating agent, e.g. a proper amount of anhydrous sodium sulfate, whereby a dehydration reaction takes place.

In case $R^5$ is such an alkyl group as t-butyl, the compound is treated in the presence of an arylsulfonic acid, whereby the dealkylated compound is given without affecting the acid amide bond to give the desired free acid.

The 1-acyl-3-hydroxy-2,3-dihydro-3-indolylacetic acid derivative, the starting material of the above process is obtained by adding a halogenoacetic acid ester to a 1-acyl-indolyl derivative corresponding thereto and heating the mixture with stirring in a non-polar organic solvent in the presence of zinc grains and, if necessary, a small piece of iodine. One example of the above reaction is as follows:

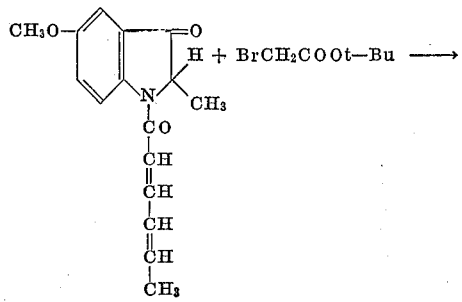

5 ⟶

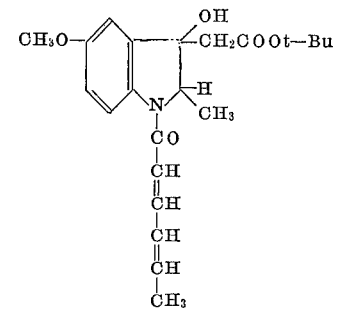

Further, when the dehydration reaction and the hydrolysis of ester are effected, there is obtained the desired 1-(2',4'-hexadienoyl)-2-methyl-5-methoxy-3-indolyl-acetic acid.

According to the above process, the following novel compounds are obtained:

1-(2',4'-hexadienoyl)-2-methyl-5-methoxy-3-indolylacetic acid
1-(2',4'-hexadienoyl)-2-methyl-4-methoxy-3-indolylacetic acid
1-(2',4'-hexadienoyl)-2-methyl-6-methoxy-3-indolylacetic acid
1-(2',4'-hexadienoyl)-2-methyl-5-methylthio-3-indolyl-acetic acid
1-chloroacetyl-2-methyl-5-methoxy-3-indolylacetic acid
1-chloroacetyl-2,5-dimethyl-3-indolylacetic acid
1-crotonoyl-2-methyl-5-methoxy-3-indolylacetic acid
1-acryloyl-2-methyl-5-methoxy-3-indolylacetic acid
1-n-decanoyl-2-methyl-5-methoxy-3-indolylacetic acid
1-n-hexanoyl-2-methyl-5-chloro-3-indolylacetic acid
1-(3'-chloropropionoyl)-2-methyl-5-methoxy-3-indolyl-acetic acid
1-(3'-methylacryloyl)-2-methyl-5-methoxy-3-indolyl-acetic acid
1-(4'-chlorobutyroyl)-5-methoxy-3-indolylacetic acid
1-butyroyl-5-methoxy-3-indolylacetic acid
1-butyroyl-2-methyl-5-methoxy-3-indolylacetic acid
1-butyroyl-2-methyl-3-indolylacetic acid
1-butyroyl-2-methyl-5-chloro-3-indolylacetic acid Further, the desired 1-acyl-3-indolyl aliphatic acid compounds can also be obtained according to the following process:

That is, the 1-acyl-3-indolyl aliphatic acid derivatives represented by the Formula I can be obtained by dehydrogenating 1-acyl-2,3-dihydro-3-indolyl aliphatic acid derivatives represented by the general formula:

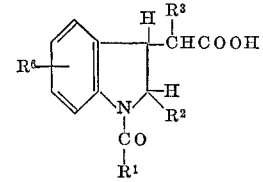

[XIV]

wherein $R^1$, $R^2$, $R^3$ and $R^6$ are as defined before.

In this dehydrogenation reaction, non-polar solvent such as benzene, xylene and toluene and other various organic solvents such as acetone, acetic acid, chloroform, ethanol and methanol can be used.

As oxidizing agents, chloranil, selenium dioxide, halogen and the like oxidizing agents are used.

According to the above method, the following compounds can be easily obtained:

1-chloroacetyl-2-methyl-5-methoxy-3-indolylacetic acid
α-(1-chloroacetyl-2-methyl-5-methoxy-3-indolyl)-propionic acid
1-chloroacetyl-2-methyl-5-chloro-3-indolylacetic acid
1-chloroacetyl-2-methyl-5-methylthio-3-indolylacetic acid
1-chloroacetyl-2,5-dimethyl-3-indolylacetic acid
1-acryloyl-2-methyl-5-methoxy-3-indolylacetic acid 1-(2',4'-hexadienoyl)-2-methyl-5-methoxy-3-indolylacetic acid
1-(2',4'-hexadienoyl)-2-methyl-3-indolylacetic acid
1-(2',4'-hexadienoyl)-2-methyl-4-methoxy-3-indolylacetic acid
1-(2',4'-hexadienoyl)-2-methyl-6-methoxy-3-indolylacetic acid
1-(2',4'-hexadienoyl)-5-methoxy-3-indolylacetic acid
1-n-decanoyl-2-methyl-5-methoxy-3-indolylacetic acid
1-n-octanoyl-2-methyl-5-methoxy-3-indolylacetic acid
1-iso-butyroyl--methyl-5-methoxy-3-indolylacetic acid.

The starting material 1-acyl-2,3-dihydro-3-indolyl aliphatic acid derivative is obtained in high yield by reacting a 2,3-dihydro-3-indolyl aliphatic acid derivative corresponding thereto with acyl chloride in the presence of an alkali reagent.

The novel 1-acyl-3-indolyl aliphatic acid derivatives obtained in accordance with the present invention are useful compounds which have markedly excellent anti-inflammation, analgesic and anti-pyretic actions as well as anti-arteriosclerotic and anti-hypercholestemic effects.

For example, 1-(2',4'-hexadienoyl)-2-methyl - 5 - methoxy-3-indolylacetic acid is a novel compound which has never been reported in an literature. According to pharmacological test, the above compound is markedly low in toxicity but is excellent in pharmacological activity and its therapeutic ratio is extremely great, as will be understood from the following table:

| Medicine | Effects | | |
|---|---|---|---|
| | 50% inhibiting dose of carrageenin edema of rats hind paw per os (mg./kg.) | 50% lethal dose of rat, per os (mg./kg.) | Therapeutic ratio, 50% lethal dose/ 50% inhibiting dose of carrageenin edema |
| Indometacin | 7.5 | 15 | 2.0 |
| Phenylbutazone | 320 | ca. 600 | ca. 1.9 |
| 1-(2',4'-hexadienoyl)-2-methyl-5-methoxy-3-indolylacetic acid | 75 | >1,000 | >13.3 |

Of the developed non-steroidal anti-inflammatory drugs, indometacin is greatest in the activity but is accordingly high in toxicity. The present inventors also observed that even when 10 mg./kg. of said medicine was orally administerated, a rat showed an occult bleeding. In addition thereto, all the conventional anti-inflammatory drugs tend to promote the bleeding of digestive organs and not few examples have been reported that perfolations of the stomach and intestines brought one to death. Further, phenylbutazone, which is most widely used as antiphlogistic at present, is low activity in comparison to its high acute toxicity and hence is considerably small in therapeutic ratio.

In contrast to the above facts, the 1-(2',4'-hexadienoyl)- 2-methyl-5-methoxy-3-indolylacetic acid is markedly low in toxicity, and even when 1000 mg./kg. of said acid is orally administrated to each rat and mouse, they scarcely show toxic symptoms and occult bleeding is negative in excrements thereof. Nevertheless, the activity of the acid is higher than those of phenylbutazone and oxyphenbutazone. Therefore, the therapeutic ratio thereof is far greater than any other medicine. Thus, the acid is a compound markedly high in practical value.

In addition thereto, 1-(3',3'-diethylacryloyl)-2-methyl-5-methoxy - 3 - indolylacetic acid, 1 - (5'-chloro-3'-pentenoyl)-2-methyl-5-methoxy-3-indolylacetic acid, 1-heptanoyl - 2 - methyl - 5 - methoxy-3-indolylacetic acid, 1-t-pentanoyl - 2 - methyl-5-methoxy-3-indolylacetic acid, γ-[1-(2',4' - hexadienoyl)-2-methyl-5-methoxy-3-indolyl]-butyric acid and 1-(4' - methylpentanoyl)-2-methyl-5-methoxy-3-indolylacetic acid also show substanially similar pharmocological effects.

Most of these compounds are higher in analgesic and antipyretic actions than aminopyrin and aspirin. Further, these compounds have preventive effects on experimental atherosclerosis and significant blood cholesterol lowering action.

The method of the present invention will be illustrated further in detail below, but the examples are only for illustrative purposes and are not to be construed as limiting the scope of the invention.

EXAMPLE 1

2.8 g. of $N^1$-chloroacetyl-$N^1$-(p-methoxyphenyl) hydrazine hydrochloride and 9.3 g. of levulinic acid were heated with stirring at 75° C. for 1 hour and 45 minutes. After cooling, the reaction liquid was charged with cold water, and the deposited precipitate was recovered by filtration and was dried, whereby 2.2 g. of crude crystals of 1 - chloroacetyl-2-methyl-5-methoxy - 3 - indolylacetic acid were obtained. The crude crystals were recrystallized from ethanol to obtain a pure product having a melting point of 155°–156° C.

According to the process of Example 1, a corresponding hydrazine derivative hydrochloride and an aliphatic acid derivative were heated with stirring at 75°–80° C. for 1.5–2.5 hours to obtain in high yields the compounds as enumerated below.

EXAMPLE 2

1-acetyl-2-methyl-5-methoxy-3-indolylacetic acid, M.P. 163°–164.5° C. (recrystallization solvent: acetone).

EXAMPLE 3

1 - (2',4' - hexadienoyl) - 2 - methyl - 5 - methoxy-3-indolylacetic acid, M.P. 157°–160° C. (recrystallization solvent: acetone).

EXAMPLE 4

4.8 g. of $N^1$-acetyl-$N^1$-(p-methoxyphenyl)-hydrazine hydrochloride and 2.5 g. of levulinic acid were added to 20 ml. of acetic acid, and the mixture was heated with stirring at 76° C. for 2 hours. To the reaction liquid was added about 60 ml. of water, and the deposited precipitate was filtered and was dried to obtain 4.2 g. of 1-acetyl-2 - methyl-5-methoxy-3-indolylacetic acid. This product was recrystallized with acetone to obtain a pure product having a melting point of 163°–164.5° C.

Even when the above reaction was effected using as solvent, in place of acetic acid, formic acid, propionic acid, lactic acid, butyric acid, cyclohexane, n-hexane or dioxane, desired products were obtained in high yields.

EXAMPLE 5

The process of Example 4 was repeated using methanol as solvent to obtain methyl 1-acetyl-2, 5-dimethyl-3-indolylacetate as a light yellow oily substance.

EXAMPLE 6

2.1 g. of $N^1$-chloroacetyl-$N^1$-(p-methoxyphenyl)-hydrazine and 1.6 g. of levulinic acid were added to 30 ml. of glacial acetic acid. To the mixture was further added about 2 ml. of concentrated hydrochloric acid, and the resulting mixture was heated with stirring at 75° C. for 2 hours. After completion of the reaction, the deposited precipitate was filtered and was dried, whereby 2.3 g. of 1-chloroacetyl - 2 - methyl-5-methoxy-3-indolylacetic acid was obtained. This acid was recrystallized to obtain a pure product having a melting point of 155°–157° C.

EXAMPLE 7

20 g. of $N^1$-crotonoyl-$N^1$-(p-methoxyphenyl)-hydrazine hydrochloride was added to 40 g. of levulinic acid, and the mixture was heated with stirring at 78° C. for 2.5 hours. After completion of the reaction, the reaction liquid was charged in 200 ml. of cold water, and the resulting solid substance was filtered, and extracted with ether, and then ether was distilled, whereby crude crystals of 1-crotonoyl-2-methyl-5-methoxy-3-indolylacetic acid were obtained. The crude crystals were recrystallized with a 85:15 mixed solvent of ether and alcohol to obtain 7.5 g. of a pure product, M.P. 130°–131° C., yield 44%.

According to the process of Example 7, the following compounds were obtained:

EXAMPLE 8

1-Decanoyl-2-methyl-5-methoxy - 3 - indolylacetic acid, M.P. 126° C. (recrystallization solvent: acetone).

EXAMPLE 9

Ethyl 1-crotonoyl-2-methyl-5-methoxy-3-indolylacetate, an oily substance.

EXAMPLE 10

Ethyl 1-caproyl-2,5-dimethyl-3-indolylacetate, an oily substance.

EXAMPLE 11

20 g. of $N^1$-caproyl-$N^1$-(p-methoxyphenyl)-hydrazine hydrochloride was added to 40 g. of levulinic acid, and the mixture was heated with stirring at 75° C. for 2 hours. Thereafter, the reaction liquid was charged in 100 ml. of cold water, and the resulting precipitate was filtrated and was dried, whereby 13.0 g. of crude crystals of 1 - caproyl-2-methyl-5-methoxy - 3 - indolylacetic acid were produced. The crude crystals were recrystallized with acetone-water to obtain 8.7 g. of a pure product, M.P. 140°–141° C., yield 37%.

EXAMPLE 12

17 g. of $N^1(2',4'$-hexadienoyl)-$N^1$-(p-methoxyphenyl)-hydrazine hydrochloride and 10 g. of δ-acetylvaleric acid were added to 35 ml. of acetic acid, and the mixture was heated with stirring at 70°–80° C. for 2 hours. Thereafter, the reaction liquid was charged in 150 ml. of cold water, and the resulting precipitate was filtered and was dried, whereby 10 g. of crude crystals of γ-[1-(2',4'-hexadienoyl)-2-methyl-5-methoxy-3-indolyl]-butyric acid were obtained. The crude crystals were recrystallized with acetone-water to obtain 4.6 g. of a pure product, M.P. 127°–129° C.

According to the process of Example 12, the following compounds were obtained:

EXAMPLE 13

β - [1 - (2',4' - hexadienoyl) - 2 - methyl-5-methoxy-3-indolyl]-propionic acid, M.P. 166°–167° C. (recrystallization solvent: acetone-water).

EXAMPLE 14

1 - (4' - methylpentanoyl) - 2 - methyl - 5 - methoxy-3-indolylacetic acid, M.P. 135° C. (recrystallization solvent: acetone-water).

EXAMPLE 15

1 - (4' - chlorobutyroyl) - 2 - methyl - 5-methoxy-3-indolylacetic acid, M.P. 149°–150° C. (recrystallization solvent: acetone).

EXAMPLE 16

10 g. of $N^1$-(n-decanoyl)-$N^1$-(p-methoxyphenyl)-hydrazine hydrochloride and 9 g. of benzyl levulinate were heated and stirred in 30 ml. of dioxane, and the resulting crystals were removed by filtration. The filtrate was concentrated under reduced pressure and the concentrate was washed with cold water, whereby an oily substance was produced. The oily substance was treated with acetone-water to obtain benzyl 1-decanoyl-2-methyl-5-methoxy-3-indolylacetate, M.P. 83°–85° C.

According to the process of Example 16, the following compounds were obtained:

EXAMPLE 17

Benzyl 1-decanoyl-5-methoxy-3-indolylacetate, an oily substance.

EXAMPLE 18

Benzyl 1-decanoyl-5-chloro-3-indolylacetate, an oily substance.

EXAMPLE 19

20 g. of acetaldehyde-phenylhydrazone and 15.4 g. of pyridine were dissolved in 100 ml. of anhydrous ether. To the solution, chloroacetyl chloride was added dropwise over a period of about 40 minutes at 0°–5° C., while cooling with ice. Thereafter, the solution was stirred for 4 hours, while further cooling with ice, to deposit a precipitate. The precipitate was filtered and was then washed with 50 ml. of cold ether. The filtrate and the washings were combined, and the resulting liquid was concentrated to about ⅓ of the original amount. To the liquid, 60 ml. of anhydrous ethanol was added, and a dry hydrogen chloride gas was introduced into the liquid, while cooling with ice. After storing the liquid with cooling, the deposited crystals were collected by filtration, were washed with ether and were then dried to obtain 9.9 g. of $N^1$-(chloroacetyl) - phenylhydrazine hydrochloride, M.P. 144°–147° C. (decomposition). This hydrochloride was charged in a 5% aqueous sodium carbonate solution to obtain substantially quantitatively free $N^1$-(chloroacetyl)-phenylhydrazine, which was then recrystallized with ethanol to obtain a pure product having a melting point of 125°–126° C.

EXAMPLE 20

21 g. of acetaldehyde methoxyphenylhydrazone was dissolved in 60 ml. of pyridine. To the solution, 21 g. of 2,4-hexadienoyl chloride was added dropwise while strongly cooling with ice-sodium chloride. During the addition, the temperature was maintained at −2° C. to +3° C. The time required for the dropwise addition was about 20 minutes. The reaction liquid was allowed to stand overnight with ice-cooling and was then charged in 300 ml. of cold water to deposit crystals. The crystals were collected by filtration and were then dried to obtain 19 g. of crude crystals of acetaldehyde $N^1$-(2',4'-hexadienoyl) - $N^1$ - (p-methoxyphenyl)-hydrazone, M.P. 139°–141° C.

EXAMPLE 21

According to the process of Example 20, acetaldehyde p-methoxyphenylhydrazone gave acetaldehyde $N^1$-caproyl-$N^1$-(p-methoxyphenyl)-hydrazone, M.P. 70°–72° C., yield 62%.

EXAMPLE 22

12 g. of acetaldehyde p-methoxyphenylhydrazone was dissolved in 50 ml. of anhydrous ether. To the solution, chloroacetyl chloride was added dropwise at 0° C. over a period of about 1 hour. After allowing the solution to cool overnight, the resulting precipitate was filtered off. The filtrate was concentrated under reduced pressure and the concentrate was charged with petroleum ether to deposit a precipitate. The precipitate was filtered and was then dried to obtain 17 g. of crude crystals of acetaldehyde $N^1$ - (chloroacetyl) - $N^1$ - (p-methoxyphenyl)-hydrazone, M.P. 68°–73° C.

EXAMPLE 23

3.1 g. of phenylhydrazone of methyl luvulinate

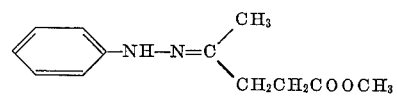

was dissolved in 15 ml. of pyridine. To the solution, 1.8 g. of chloroacetyl chloride was added dropwise, with ice-cooling and stirring. Thereafter, the solution was allowed to stand at room temperature for several days. The reaction liquid was then charged in cold water to obtain an oily substance. This oily substance was treated and purified with ethanol-water to obtain $N^1$-(chloroacetyl)-$N^1$-phenylhydrazine, M.P. 124°–126° C.

EXAMPLE 24

According to the process of Example 23, acetaldehyde-p-methoxyphenylhydrazone was treated to obtain substantially quantitatively crude crystals of acetaldehyde $N^1$-acetyl-$N^1$-(p-methoxyphenyl)-hydrazone, M.P. 77°–80° C.

EXAMPLE 25

According to the process of Example 23, acetaldehyde phenylhydrazone was treated to obtain substantially quantitatively crude crystals of acetaldehyde $N^1$-acetyl-$N^1$-phenylhydrazone, M.P. 91°–95° C.

EXAMPLE 26

According to the process of Example 20, acetaldehyde p-chlorophenylhydrazone was treated to obtain acetaldehyde $N^1$-(2',4'-hexadienoyl)-$N^1$-(p-chlorophenyl)-hydrazone, M.P. 125° C.

EXAMPLE 27

According to the process of Example 20, acetaldehyde p-methoxyphenylhydrazone was treated to obtain substantially quantitatively acetaldehyde $N^1$-(n-decanoyl)-$N^1$-(p-methoxyphenyl)-hydrazone, M.P. 74°–76° C.

EXAMPLE 28

According to the process of Example 20, benzaldehyde-m-tolylhydrazone was treated to obtain benzaldehyde $N^1$-chloroacetyl-$N^1$-(m-tolyl)-hydrazone.

EXAMPLE 29

According to the process of Example 20, acetaldehyde p-tolylhydrazone was treated to obtain in a yield of 70% acetaldehyde-$N^1$-(2',4' - hexadienoyl)-$N^1$-(p-tolyl)hydrazone, M.P. 110°–112° C.

EXAMPLE 30

According to the process of Example 20, acetaldehyde p-methoxyphenylhydrazone was treated to obtain in a yield of 93% acetaldehyde $N^1$-$\beta,\beta$-dimethyl-acryloyl-$N^1$-(p-methoxyphenyl)-hydrazone, M.P. 110°–116° C.

EXAMPLE 31

According to the process of Example 20, acetaldehyde p-methoxyphenylhydrazone was treated to obtain in a yield of 50% acetaldehyde $N^1$-crotonyl-$N^1$-(p-methoxyphenyl)-hydrazone, M.P. 106°–108° C.

EXAMPLE 32

According to the process of Example 20, acetaldehyde p-tolylhydrazone was treated to obtain substantially quantitatively acetaldehyde $N^1$-acetyl-$N^1$-(p-tolyl)-hydrazone, M.P. 63°–64° C.

EXAMPLE 33

According to the process of Example 20, acetaldehyde p-methylthiophenylhydrazone was treated to obtain acetaldehyde $N^1$-acetyl-$N^1$-(p-methylthiophenyl) - hydrazone, M.P. 71°–74° C.

EXAMPLE 34

According to the process of Example 20, acetaldehyde p-methoxyphenylhydrazone was treated to obtain in a yield of about 55% acetaldehyde $N^1$-(4'-methylpentanoyl)-$N^1$-(p-methoxyphenyl)-hydrazone, M.P. 69°–70° C.

EXAMPLE 35

According to the process of Example 20, acetaldehyde p-methoxyphenylhydrazone was treated to obtain in a yield of 62% acetaldehyde $N^1$-(4'-chlorobutyloyl)-$N^1$-(p-methoxyphenyl)-hydrazone, M.P. 80°–82° C.

EXAMPLE 36

94 g. of acetaldehyde p-tolylhydrazone was added to 60 g. of pyridine and 1200 ml. of ether. To the mixture, 103 g. of caproyl chloride was added dropwise over a period of 40 minutes, while cooling with ice. The mixture was stirred at room temperature for 3 hours to deposit a precipitate. The precipitate was separated by filtration, and filtrate was concentrated to a small amount. To the residue, 100 ml. of ethanol was added, and a dry hydrogen chloride gas was introduced into the resulting liquid with ice-cooling, whereby a large amount of crystals were formed. The liquid was stored in a refrigerator for one day, and the crystals were collected by filtration and were then washed with ether to obtain 72 g. of $N^1$-(n-caproyl) - $N^1$ - (p-tolyl)-hydrazine hydrochloride, M.P. 133°–135° C. (decomposition).

EXAMPLE 37

According to the process of Example 36, benzaldehyde p-tolylhydrazone was treated to obtain $N^1$-acetyl-$N^1$-(p-tolyl)-hydrazine hydrochloride, M.P. 177° C. (decomposition).

EXAMPLE 38

According to the process of Example 36, 24 g. of acetaldehyde p-chlorophenylhydrazone was treated to obtain 18 g. of $N^1$-(3'-chloropropionyl)-$N^1$-(p-chlorophenyl)-hydrazine hydrochloride, M.P. 213°–214° C. (decomposition), yield 48%.

EXAMPLE 39

According to the process of Example 36, 100 g. of acetaldehyde p-tolylhydrazone was treated to obtain 67 g. of $N^1$-(3'-chloropropionyl)-$N^1$-(p-tolyl)hydrazine hydrochloride, M.P. 199°–205° C.

EXAMPLE 40

49 g. of acetaldehyde $N^1$-(4'-chlorobutyloyl)-$N^1$-(p-methoxyphenyl)-hydrazone

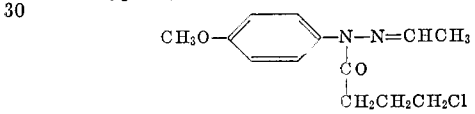

was dissolved in 200 ml. of alcohol. Into the solution, a dry hydrogen chloride gas was introduced, with ice-cooling. Thereafter, excess hydrogen chloride was removed under reduced pressure whereby a large amount of crystals were deposited. The crystals were collected by filtration and were dried to obtain $N^1$-(4'-chlorobutyloyl)-$N^1$-(p-methoxyphenyl)-hydrazine hydrochloride, M.P. 159° C. (decomposition), yield 72%.

EXAMPLE 41

According to the process of Example 40, benzaldehyde $N^1$ - (4' - chlorobutyroyl) - $N^1$ - (p - methoxyphenyl)-hydrazone was treated to obtain $N^1$-(4'-chlorobutyroyl)-$N^1$-(p-methoxyphenyl)-hydrazine.

EXAMPLE 42

According to the process of Example 40, acetaldehyde $N^1$ - (2',4' - hexadienoyl) - $N^1$ - (p - methoxyphenyl)-hydrazone represented by the following formula.

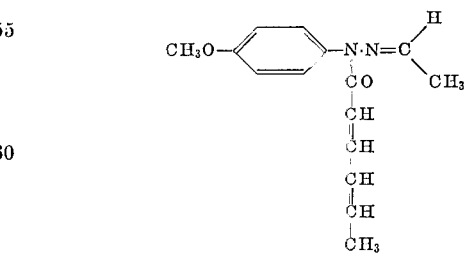

was treated to obtain quantitatively $N^1$-(2',4'-hexadienyl)-$N^1$-(p-methoxyphenyl) - hydrazine hydrochloride, M.P. 156°–160° C. (decomposition).

EXAMPLE 43

According to the process of Example 40, acetaldehyde $N^1$ - (chloroacetyl) - $N^1$ - phenylhydrazone was treated to obtain substantially quantitatively $N^1$-(chloroacetyl)-$N^1$-phenylhydrazine hydrochloride, M.P. 144°–147° C. (decomposition). This hydrochloride was added to a 5% aqueous sodium carbonate solution, whereby free $N^1$-

(chloroacetyl) - $N^1$ - phenylhydrazine was quantitatively produced. The thus produced compound was recrystallized with ethanol to obtain a pure product having a melting point of 125°–126° C.

EXAMPLE 44

According to the process of Example 40, acetaldehyde $N^1$ - acetyl - $N^1$ - phenylhydrazone was treated to obtain $N^1$ - acetyl - $N^1$ - phenylhydrazine hydrochloride, M.P. 182°–183° C. (decomposition).

EXAMPLE 45

According to the process of Example 40, acetaldehyde $N^1$ - acetyl - $N^1$ - (p-methoxyphenyl) - hydrazone was treated to obtain $N^1$ - acetyl - $N^1$ - (p - methoxyphenyl)-hydrazine hydrochloride, M.P. 165°–167° C. (decomposition).

EXAMPLE 46

According to the process of Example 40, acetaldehyde $N^1$ - (chloroacetyl) - $N^1$ - (p-methoxyphenyl)-hydrazone was treated to obtain $N^1$-(chloroacetyl)-$N^1$-(p-methoxyphenyl)-hydrazine hydrochloride, M.P. 150°–151° C. (decomposition). Further, according to the process of Example 43, said hydrochloride was treated to obtain free $N^1$ - (chloroacetyl) - $N^1$ - (p-methoxyphenyl)-hydrazine, M.P. 121°–122° C.

EXAMPLE 47

According to the process of Example 40, 37.5 g. of acetaldehyde $N^1$ - (4' - methylpentanoyl)-$N^1$-(p-methoxyphenyl)-hydrazone was treated to obtain 21.7 g. of $N^1$ - (4' - methylpentanoyl) - $N^1$ - (p-methoxyphenyl)-hydrazine hydrochloride, M.P. 159°–162° C. (decomposition), yield 56%.

EXAMPLE 48

According to the process of Example 40, 20 g. of acetaldehyde $N^1$ - (n - hexanoyl) - $N^1$ - (p - methoxyphenyl)-hydrazone was treated to obtain 27.9 g. of $N^1$-(n - hexanoyl) - $N^1$ - (p - methoxyphenyl) - hydrazine hydrochloride, M.P. 154°–155° C. (decomposition), yield 100%.

EXAMPLE 49

According to the process of Example 40, 175 g. of acetaldehyde $N^1$ - (n-decanoyl) - $N^1$ - (p-methoxyphenyl)-hydrazone was treated to obtain 80 g. of $N^1$-(n-decanoyl)-$N^1$ - (p - methoxyphenyl) - hydrazine hydrochloride, M.P. 137°–139° C. (decomposition).

EXAMPLE 50

114 g. of acetaldehyde $N^1$-(2',4'-hexadienoyl)-$N^1$-p-tolylhydrazone was suspended in 300 ml. of ethanol. Into the suspension, a dry hydrogen chloride gas was introduced to saturation. After allowing the suspension to stand for several hours, ether was added until a precipitate was produced, and the reaction liquid was stored with cooling overnight to deposit a large amount of crystals. The crystals were then collected by filtration and were washed with ether to obtain 58 g. of $N^1$-(2',4'-hexadienoyl) - $N^1$ - p - tolylhydrazine hydrochloride, M.P. 138°–141° C. (decomposition).

EXAMPLE 51

According to the process of Example 50, 13 g. of acetaldehyde $N^1$ - (2',4' - hexadienoyl) - $N^1$ - (p-chlorophenyl)-hydrazone was treated to obtain 10 g. of $N^1$-(2',4' - hexadienoyl) - $N^1$ - (p-chlorophenyl)-hydrazine hydrochloride, M.P. 163° C. (decomposition), yield 74%.

EXAMPLE 52

According to the process of Example 50, 105 g. of acetaldehyde $N^1$ - (2' - n - butenoyl) - $N^1$ - (p-methoxyphenyl)-hydrazone was treated to obtain 101 g. of $N^1$-(2' - n - butenoyl) - $N^1$ - (p-methoxyphenyl)-hydrazine hydrochloride, M.P. 155°–159° C., yield 92%.

EXAMPLE 53

According to the process of Example 50, acetaldehyde $N^1$ - (3' - chloropropionyl) - $N^1$ - (p - chlorophenyl)-hydrazone was treated to obtain $N^1$-(3'-chloropropionyl)-$N^1$ - (p - chlorophenyl) - hydrazine hydrochloride, M.P. 213°–214° C. (decomposition).

EXAMPLE 54

According to the process of Example 50, acetaldehyde $N^1$ - (3' - chloropropionyl) - $N^1$ - p - tolylhydrazone was treated to obtain $N^1$ - (3' - chloropropionyl) - $N^1$ - p-tolylhydrazine hydrochloride, M.P. 200°–204° C.

EXAMPLE 55

According to the process of Example 50, acetaldehyde $N^1$-(n-hexanoyl)-$N^1$-phenylhydrazone was treated to obtain $N^1$-(n-hexanoyl)-$N^1$-phenylhydrazine hydrochloride, M.P. 125°–130° C.

EXAMPLE 56

According to the process of Example 50, acetaldehyde $N^1$-(n-hexanoyl)-$N^1$-p-tolylhydrazone was treated to obtain $N^1$-(n-hexanoyl)-$N^1$-m-tolylhydrazine hydrochloride, M.P. 133°–135° C. (decomposition).

EXAMPLE 57

According to the process of Example 50, acetaldehyde $N^1$-(n-hexanoyl)-$N^1$-m-tolylhydrazone was treated to obtain $N^1$-(n-hexanoyl)-$N^1$-m-tolylhydrazine hydrochloride, M.P. 125°–129° C.

EXAMPLE 58

According to the process of Example 50, acetaldehyde $N^1$-acetyl-$N^1$-p-tolylhydrazone was treated to obtain $N^1$-acetyl-$N^1$-tolylhydrazine hydrochloride, M.P. 177° C. (decomposition).

EXAMPLE 59

According to the process of Example 50, acetaldehyde $N^1$-(n-hexanoyl) - $N^1$ - (p-methylthiophenyl)-hydrazone was treated to obtain $N^1$-(n-hexanoyl)-$N^1$-(p-methylthiophenyl)-hydrazine hydrochloride, M.P. 142°–145° C.

EXAMPLE 60

10 g. of $N^1$-(n-octanoyl)-m-tolylhydrazine hydrochloride and 10 g. of levulinic acid were heated at 75°–77° C. for 4 hours. After cooling the mixture, the resulting glutinous substance was dissolved in 30 ml. of acetone and insolubles were separated by filtration. The filtrate was charged in 30 ml. of water and the liquid was stored with cooling overnight. Thereafter, deposited crystals were collected by filtration and were dried to obtain 6.8 g. of a mixture of 1-(n-octanoyl)-2,4-dimethyl-3-indolylacetic acid and 1-(n-octanoyl)-2,6-dimethyl-3-indolylacetic acid.

EXAMPLE 61

4.7 g. of t-butyl 1-(2',4'-hexadienoyl)-2-methyl-5-methoxy-3-indolylacetate was added to 45 ml. of benzene. To the mixture was further added p-toluenesulfonic acid, and the mixture was refluxed. After heating, the reaction mixture was washed with 30 ml. of a 10% aqueous sodium bicarbonate solution, was successively washed several times with water and was then dried. Thereafter, benzene was removed by distillation under reduced pressure, and the reaction mixture was purified by recrystallization with acetone to obtain 1-(2',4'-hexadienoyl) - 2 - methyl-5-methoxy-3-indolylacetic acid, M.P. 161°–162° C.

*Elementary analysis.*—Calculated (percent): C, 65.64; H, 5.84; N 4.25. Found (percent): C, 65.53; H, 5.62; N, 4.41.

According to the above process, the following compounds were synthesized:

EXAMPLE 62

1 - decanoyl-2-methyl-5-methoxy-3-indolylacetic acid, M.P. 126° C.

*Elementary analysis.*—Calculated (percent): C, 70.80; H, 8.32; N, 3.75. Found (percent): C, 70.93; H, 8.41; N, 3.98.

EXAMPLE 63

1 - (4'-chlorobutyloyl) - 2-methyl-5-methoxy-3-indolylacetic acid, M.P. 149°–150° C.

*Elementary analysis.*—Calculated (percent): C, 59.35; H, 5.60; N, 4.33; Cl, 10.95. Found (percent): C, 59.00; H, 5.60; N, 4.22; Cl, 10.23.

EXAMPLE 64

1 - (4' - methylpentanoyl)-2-methyl-5-methoxy-3-indolylacetic acid, MP. 135° C.

*Elementary analysis.*—Calculated (percent): C, 68.12; H, 7.30; N, 4.16. Found (percent): C, 68.15; H, 7.45; N, 4.46.

EXAMPLE 65

3.6 g. of $N^1$-(2',4'-hexadienoyl) - $N^1$ - (p-methoxyphenyl)-hydrazine hydrochloride and 2.4 g. of acetonylmalonic acid were heated at 85° C. with stirring in 10 ml. of acetic acid for 4 hours. After cooling, the mixture was charged in cold water to deposit crystals. The crystals were recovered by filtration and were dried, whereby 3.0 g. of crude crystals of 1-(2',4'-hexadienoyl)-2-methyl-5-methoxy-3-indolylacetic acid were obtained. The crystals were recrystallized with acetone-water to obtain light yellow crystals, M.P. 162°–163° C.

According to the same process as above, the following compounds were obtained:

EXAMPLE 66

1 - hexanoyl-2-methyl-5-methoxy-3-indolylacetic acid, M.P. 140°–141° C.

EXAMPLE 67

1-chloroacetyl - 2 - methyl-5-methoxy-3-indolylacetic acid, M.P. 156°–157° C.

EXAMPLE 68

7.5 g. of acetaldehyde $N^1$-chloroacetyl-$N^1$-(p-methoxyphenyl)-hydrazone was added to 50 g. of levulinic acid, and 1.45 g. of dry hydrogen chloride was introduced into the mixture wth ice-cooling. Thereafter, the temperature was gradually elevated and the mixture was heated at 80° C. for 3 hours. After allowing to stand overnight, the mixture was charged in a large amount of water, whereby a resinous substance was formed. The resinous substance was repeatedly recrystallized from alcohol and acetone with active carbon to obtain beautiful crystals of 1-chloroacetyl-2-methyl-5-methoxy - 3 - indolylacetic acid, M.P. 156°–157° C.

According to the same process as above, the following compounds were obtained:

EXAMPLE 69

1 - acetyl - 2 - methyl - 5 - methoxy - 3 - indolylacetic acid, M.P. 162°–164° C.

EXAMPLE 70

1 - (n - hexanoyl) - 2 - methyl - 5 - methoxy - 3 - indolylacetic acid, M.P. 138°–140° C.

EXAMPLE 71

1 - acetyl - 2 - methyl - 5 - methoxy - 3 - indolylacetic acid, M.P. 167°–168° C.

*Elementary analysis.*—Calculated (percent): C, 64.36; H, 5.79; N, 5.36. Found (percent): C, 63.76; H, 6.26; N, 5.13.

EXAMPLE 72

β - [1 - (2',4' - hexadienoyl) - 2 - methyl - 5 - methoxy-3-indolyl]-propionic acid, M.P. 166°–167° C.

EXAMPLE 73

γ - [1 - (2',4' - hexadienoyl) - 2 - methyl - 5 - methoxy-3-indolyl]-butyric acid, M.P. 127°–129° C.

EXAMPLE 74

2.5 g. of p-methoxyphenylhydrazone of methyl levulinate was added to 50 ml. of glacial acetic acid. To the mixture, 0.9 g. of acetyl chloride was added dropwise, and the mixture was heated at 80° C. for 3 hours. Thereafter, the mixture was charged with stirring in 50 ml. of cold water, whereby an oily substance was formed. The oily substance was extracted with ether to obtain methyl 1 - acetyl - 2 - methyl - 5 - methoxy - 3 - indolylacetate. Infrared absorption spectrum of this product entirely coincided with that of a standard product prepared by the acetylation of methyl 2 - methyl - 5 - methoxy-3-indolylacetate.

EXAMPLE 75

In the reaction of Example 74, 1.2 g. of acetic anhydride was used in place of 0.9 g. of acetyl chloride, whereby methyl 1 - acetyl - 2 - methyl - 5 - methoxy-3-indolylacetate was obtained as well.

EXAMPLE 76

3.7 g. of 1 - acetyl - 2 - methyl - 5 - methoxy - 2,3-dihydro-3-indolylacetic acid was added to 100 ml. of benzene, and 7.5 g. of chloranyl was further added thereto. The reaction mixture was heated and refluxed for 3 hours. After removing the solvent by reduced pressure distillation, the residue was dissolved out with acetone and insolubles were removed. Thereafter, the acetone solution was dried up, whereby crude crystals of 1-acetyl-2 - methyl - 5 - methoxy - 3 - indolylacetic acid were formed. The crystals were recrystallized from acetone-water to obtain a light yellow pure product, M.P. 163°–164° C.

According to the process of Example 76, the following compound was produced:

EXAMPLE 77

1 - chloroacetyl - 2 - methyl - 5 - methoxy - 3 - indolylacetic acid, M.P. 156°–157° C.

What we claim is:

1. A compound of the formula:

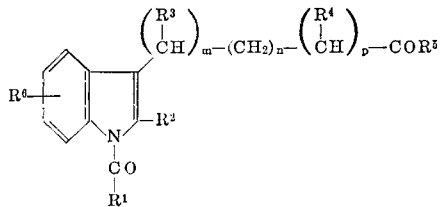

wherein $R^1$ is $(C_1-C_9)$ alkyl, monochloro-$(C_1-C_3)$ alkyl or $(C_5)$ alkenyl; $R^2$ is $(C_1-C_3)$ alkyl; $R^3$ is a hydrogen atom or $(C_1-C_2)$ alkyl; $R_4$ is a hydrogen atom; $R_5$ is hydroxy; $R^6$ is $(C_1-C_3)$ alkyl, $(C_1-C_3)$ alkoxy, methylthio, or a chlorine atom; *m* and *p* are, respectively, 0 or 1; and *n* is 0 or an integer of from 1 to 3.

2. A compound according to claim 1 of the formula:

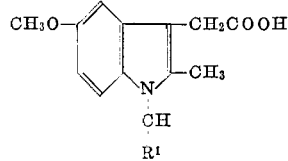

3. A compound according to claim 1 which is 1-chloroacetyl - 2 - methyl - 5 - methoxy - 3 - indolylacetic acid.

4. A compound according to claim 1 which is 1-(γ-chloro - n - butanoyl) - 2 - methyl - 5 - methoxy - 3 - indolylacetic acid.

5. A compound according to claim 1 which is 1-acetyl-2 - methyl - 5 - methyl - 3 - indolylacetic acid or 1-n-decanoyl-2-methyl-5-methoxy-3-indolylacetic acid.

6. A compound according to claim 1 which is 1-(2',4'-hexadienoyl) - 2 - methyl - 5 - methoxy - 3 - indolylacetic acid.

7. A compound according to claim 1 which is 1-n-hexanoyl-2-methyl-5-methoxy-3-indolylacetic acid.

8. A compound according to claim 1 which is 1-(γ-methyl - n-pentanoyl)-2-methyl-5-methoxy-3-indolylacetic acid.

9. A process for producing 3-indolylaliphatic acid compounds of the formula:

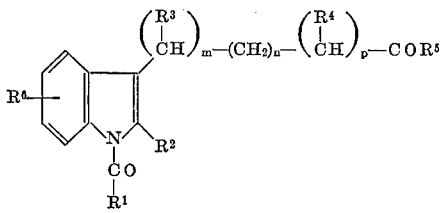

wherein $R^1$ is alkyl having up to 10 carbon atoms, chlorine-substituted alkyl having up to 10 carbon atoms or alkenyl having up to 10 carbon atoms; $R^2$ and $R^3$ are, respectively, a hydrogen atom, or $(C_1-C_3)$ alkyl; $R^4$ is a hydrogen atom, carboxyl or alkoxy $(C_1-C_4)$ carbonyl; $R^5$ is alkoxy having up to 4 carbon atoms, benzyloxy, hydroxy or amino; $R^6$ is $(C_1-C_3)$ alkyl, $(C_1-C_3)$ alkyl thio, a chlorine atom or a hydrogen atom; $m$ and $p$ are, respectively 0 or 1; and $n$ is 0 or an integer of from 1 to 3, which comprises reacting at an elevated temperature an $N^1$-acylated phenylhydrazine compound of the formula:

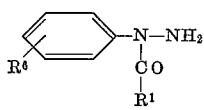

wherein $R^1$ and $R^6$ have the same meanings as identified above, with an aliphatic acid compound of the formula:

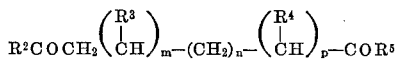

wherein $R^2$, $R^3$, $R^4$, $R^5$, $m$, $n$ and $p$ have the same meanings as identified above to yield the 3-indolyl aliphatic acid compound.

10. A process for producing 3-indolyl aliphatic acid compounds of the formula:

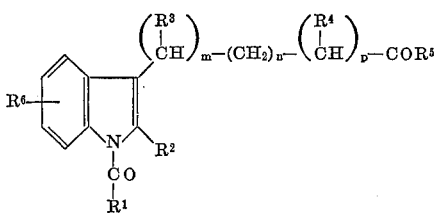

wherein $R^1$ is alkyl having up to 10 carbon atoms, chlorine-substituted alkyl having up to 10 carbon atoms or alkenyl having up to 10 carbon atoms; $R^2$ and $R^3$ are, respectively, a hydrogen atom, or $(C_1-C_3)$ alkyl; $R^4$ is a hydrogen atom, carboxy or alkoxy $(C_1-C_4)$ carbonyl; $R^5$ is alkoxy having up to 4 carbon atoms, benzyloxy, hydroxy or amino; $R^6$ is $(C_1-C_3)$ alkyl, $(C_1-C_3)$ alkoxy, alkyl $(C_1-C_3)$ thio, a halogen atom or a hydrogen atom; $m$ and $p$ are, respectively, 0 or 1; and $n$ is 0 or an integer of from 1 to 3, which comprises decomposing an $N^1$-acylated phenylhydrazone compound of the formula:

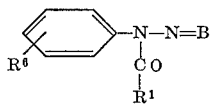

wherein $R^1$ and $R^6$ have the same meanings as identified above and B is an alkyl $(C_1-C_4)$ aldehyde, a phenylaldehyde or a chloral residue with a mineral acid to yield an $N^1$-acylated phenylhydrazine compound of the formula:

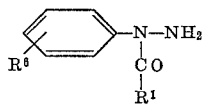

wherein $R^1$ and $R^6$ have the same meanings as identified above, and reacting at an elevated temperature the resultant $N^1$-acylated phenylhydrazine compound with an aliphatic acid compound of the formula:

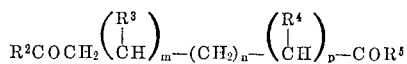

wherein $R^2$, $R^3$, $R^4$, $R^5$, $m$, $n$ and $p$ have the same meanings as identified above to yield the 3-indolylaliphatic acid compound.

11. A process for producing 3-indolyl aliphatic acid compounds of the formula:

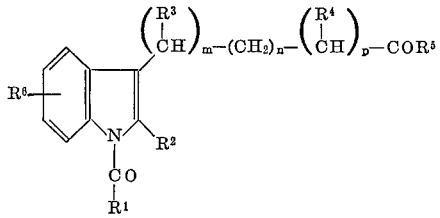

wherein $R^1$ is alkyl having up to 10 carbon atoms, chlorine-substituted alkyl having up to 10 carbon atoms, or alkenyl having up to 10 carbon atoms; $R^2$ and $R^3$ are, respectively, a hydrogen atom, or $(C_1-C_3)$ alkyl; $R^4$ is a hydrogen atom, or alkoxy $(C_1-C_4)$ carbonyl; $R^5$ is alkoxy having up to 4 carbon atoms, benzyloxy, hydroxy or amino; $R^6$ is $(C_1-C_3)$ alkyl, $(C_1-C_3)$ alkoxy, alkyl $(C_1-C_3)$ thio, a chlorine atom or a hydrogen atom; $m$ and $p$ are respectively, 0 or 1; and $n$ is 0 or an integer of from 1 to 3, which comprises reacting a phenylhydrazone compound of the formula:

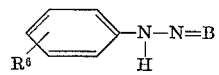

wherein $R^6$ has the same meaning as identified above and B is an alkyl $(C_1-C_4)$ aldehyde, a phenylaldehyde or chloral residue, with a compound having the formula:

wherein $R^1$ has the same meanings as identified above and Y is a halogen atom to yield an $N^1$-acylated phenylhydrazone compound of the formula:

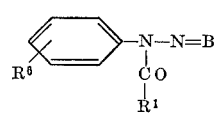

wherein $R^1$, $R^6$ and B have the same meanings as identified above, decomposing the resultant $N^1$-acylated phenylhydrazone compound with a mineral acid to yield an $N^1$-acylated phenylhydrazine compound of the formula:

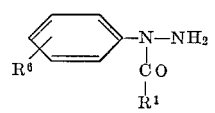

wherein $R^1$ and $R^6$ have the same meanings as identified above, and reacting at an elevated temperature the resultant $N^1$-acylated phenylhydrazine compound with an aliphatic acid compound of the formula:

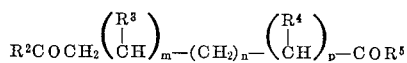

wherein $R^2$, $R^3$, $R^4$, $R^5$, $m$, $n$ and $p$ have the same meanings as identified above to yield the 3-indolyl aliphatic acid compound.

12. A process for producing 3-indolyl aliphatic acid compounds of the formula:

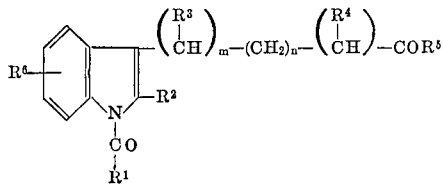

wherein $R^1$ is alkyl having up to 10 carbon atoms, chlorine-substituted alkyl having up to 10 carbon atoms, or alkenyl having up to 10 carbon atoms; $R^2$ and $R^3$ are, respectively, a hydrogen atom, or $(C_1-C_3)$ alkyl; $R^4$ is a hydrogen atom, carboxy or alkoxy $(C_1-C_4)$ carbonyl; $R^5$ is alkoxy having up to 4 carbon atoms, benzyloxy, hydroxy or amino; $R^6$ is $(C_1-C_3)$ alkyl, $(C_1-C_3)$ alkoxy, alkyl $(C_1-C_3)$ thio, a chlorine atom or a hydrogen atom; $m$ and $p$ are, respectively, 0 or 1; and $n$ is 0 or an integer of from 1 to 3, which comprises reacting a phenylhydrazone compound of the formula:

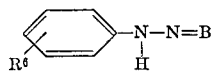

wherein $R^6$ has the same meaning as identified above and B is an alkyl $(C_1-C_4)$ aldehyde, a phenylaldehyde or a chloral residue, the —N=B bonding of the phenylhydrazone compound being comparatively weak, with a compound having the formula:

wherein $R^1$ has the same meanings as identified above and Y represents a halogen atom to yield an $N^1$-acylated phenylhydrazine compound of the formula:

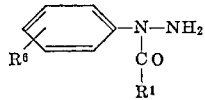

wherein $R^1$ and $R^6$ have the same meanings as identified above, and reacting at an elevated temperature the resultant $N^1$-acylated phenylhydrazine compound with an aliphatic acid compound of the formula:

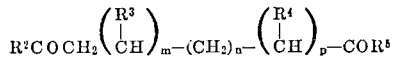

wherein $R^2$, $R^3$, $R^4$, $R^5$, $m$, $n$ and $p$ have the same meanings as identified above to yield the 3-indolylaliphatic acid compound.

13. A method according to claim 9, wherein the 1-acyl-3-indolylaliphatic acid compounds are represented by the formula:

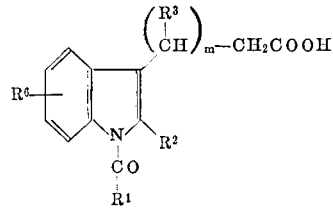

wherein $R^1$ is a non-substituted or chlorine-substituted saturated or olefinically unsaturated hydrocarbon chain having up to 7 carbon atoms; $R^2$ and $R^3$ are, respectively, a hydrogen atom or $(C_1-C_3)$ alkyl; $R^6$ is a hydrogen atom, a chlorine atom, $(C_1-C_3)$ alkyl or $(C_1-C_3)$ alkoxy; and $m$ is 0 or 1, and the aliphatic acid compound is a dicarboxylic acid derivative represented by the formula:

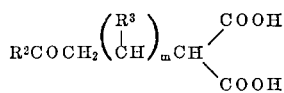

wherein $R^2$, $R^3$ and $m$ are as defined above.

References Cited

UNITED STATES PATENTS 3,161,654   12/1964   Shen _____ 260—326.12
3,370,063   2/1968    Suh _____ 260—294

OTHER REFERENCES

Ritzert et al., Chem. Abs 63-6252 (1965).
Smith, Open-Chain Nitrogen Compounds, vol. 2, pp. 163, 170, 171.

ALEX MAZEL, Primary Examiner

J. A. NARCAVAGE, Assistant Examiner

U.S. Cl. X.R.

260—326.11, 326.12, 345.8, 470, 471, 516, 518, 519, 562; 424—274